United States Patent [19]

Weissman

[11] Patent Number: 5,663,720
[45] Date of Patent: Sep. 2, 1997

[54] METHOD AND SYSTEM FOR REGIONAL TRAFFIC MONITORING

[76] Inventor: Isaac Weissman, 35 Buena Vista Dr., Hastings-on-Hudson, N.Y. 10706

[21] Appl. No.: 458,254

[22] Filed: Jun. 2, 1995

[51] Int. Cl.$^6$ ............................................. G08G 1/065
[52] U.S. Cl. .................... 340/934; 340/905; 340/961; 342/457
[58] Field of Search ............................ 340/961, 905, 340/934; 342/456, 457, 418; 364/437, 461

[56] References Cited

U.S. PATENT DOCUMENTS

| | | | |
|---|---|---|---|
| 3,582,620 | 6/1971 | Noetinger | 364/438 |
| 3,626,413 | 12/1971 | Zachmann | 342/104 |
| 4,866,438 | 9/1989 | Knisch | 340/936 |
| 4,890,113 | 12/1989 | Jacomini | 342/162 |
| 4,965,585 | 10/1990 | Lepere et al. | 342/160 |
| 4,985,705 | 1/1991 | Stammler | 342/69 |
| 5,097,267 | 3/1992 | Raviv | 342/58 |
| 5,266,799 | 11/1993 | Steinitz et al. | 324/330 |
| 5,334,982 | 8/1994 | Owen | 342/36 |
| 5,337,082 | 8/1994 | Fredericks | 342/69 |
| 5,340,056 | 8/1994 | Guelman et al. | 244/3.16 |
| 5,402,346 | 3/1995 | Lion et al. | 340/934 |

OTHER PUBLICATIONS

G.O. Allgood, "Traffic Flow Wide-Area Surveillance System Definition" Oak Ridge National Laboratory Report ORNL/TM-12827, Nov. 1994, pp. 31-63.
J. W. Andrews, "The IVHS Potential of Surface Detection Radar" in Proceedings of the IVHS Americal Annual Meeting, V1, Atlanta GA, 1994 Published by ITS America, Washington, DC, pp. 894-901.
J. Haystead, "JSTARS—Real-Time Warning and Control for Surface Warfare", Defense Electronics, Jul., 1990, pp. 31-40.
D. Fulghum, "Solar-Powered UAV to Fly at Edwards", Aviation Week and Space Technology, Oct. 4, 1993, p. 27.
D. Fulghum, "Predator UAV Produces High-Quality Images", Aviation Week and Space Technology, Nov. 28, 1994, p. 62.
J. Entzminger, "Tier II+ Unmanned Air Vehicle System", Address to the Association of Unmanned Vehicle Systems, Mar. 24, 1994.
F. E. Nathanson, "Radar Design Principles", McGraw-Hill, 2ndEd, 1990, pp. 155-158.
Jane's, "Airport and ATC Equipment", excerpt for ASDE-3 radar, 1993-94.
Inside IVHS, Jun. 6, 1994, pp. 8-9. R. A. Olson, "Active Infrared Overhead Vehicle Sensor", IEEE.

Primary Examiner—Jeffery Hofsass
Assistant Examiner—Daniel J. Wu
Attorney, Agent, or Firm—Patentec

[57] ABSTRACT

A method and system is disclosed for remote all-weather monitoring of civilian road traffic over large portions of a metropolitan region, using one or more microwave radar systems situated at elevated locations, such as high towers or pilotless aircraft. Pulse-Doppler waveforms provide, for each position of the radar beam, range-velocity maps of traffic over a number of selectable roadway sections, which maps are used to estimate the speed, density, and volume of traffic flow and to identify discontinuities in the flow which may be indicative of accidents or obstructions. In addition, a high-resolution wideband waveform can be included to provide detailed examinations of selected portions of the monitored roadway sections.

30 Claims, 7 Drawing Sheets

METHOD AND SYSTEM FOR REGIONAL TRAFFIC MONITORING

BACKGROUND OF THE INVENTION

1. Field of the Invention

The invention relates to monitoring vehicular traffic over large portions of a metropolitan region, using microwave radar to observe multiple sections of roadways from elevated locations.

2. Description of the Prior Art

With the increasing density of vehicular traffic, there has been a widely-recognized need for improved traffic monitoring in metropolitan regions, which include commuter roadways and other civilian land traffic routes. Such monitoring permits real-time redirection of traffic, rapid detection of accidents and other incidents, and assembly of databases for planning future roadway improvements. Among the benefits to be derived from better traffic monitoring may be found improved safety, decreased travel time, greater fuel conservation, improved air quality, better regional planning, and overall general convenience to the public.

Various approaches for traffic monitoring, employing diverse sensor technologies, have been tried in the past or are under consideration. Most of these approaches are highly localized and employ sensors with limited spatial coverage. A recent comprehensive survey of these approaches, referred to in the survey as "wide-area" approaches, is presented in a report by Algood, et al, Oak Ridge National Laboratory Report ORNL/TM-12827, November 1994, pp. 31–63. The approaches examined in the latter report include optical, infrared, microwave, and acoustic sensors—as well as electromagnetic detectors embedded in the roadway pavement—which convey traffic data to one or more traffic control centers. These approaches, while constituting an important step forward, generally have detection ranges limited to tens or, at best, hundreds of meters. As a result, broad regional coverage using such systems would require a very large number of sensors, with associated installation and maintenance costs, as well as costs related to connecting powerlines and data links to the individual sensors. In addition, these sensors are subject to vandalism and, in the case of optical or infrared sensors, to performance degradation under conditions of poor visibility. In the case of roadway-embedded detectors, there is the further problem of traffic disruptions during their installation and repair.

Particular attention is called to several methods which use a microwave radar beam generated by a roadside sensor, as disclosed in U.S. Pat. No. 3,582,620 to Noetinger; U.S. Pat. No. 3,626,413 to Zachmann; U.S. Pat. No. 4,866,438 to Knisch; U.S. Pat. No. 4,985,705 to Stammler; and U.S. Pat. No. 5,337,082 to Fredericks. Each of the latter entails operation at short range and surveillance of a small section of roadway. The beams are apparently fixed over periods of operation.

One article (Andrews, et al, Proceedings of the IVHS America Annual Meeting, 1994, pp. 894–901) describes microwave radar apparatus used experimentally for observing road traffic over an area appreciably larger than that for the sensors cited above. The apparatus, which was situated at Logan Airport in Boston, employed a commercially-available marine radar with a conventional rotating antenna and a pulsed magnetron transmitter tube. Individual vehicles were clearly discernible and tracked on nearby airport access roads despite the presence of interfering ground echoes, the latter being generally referred to as ground "clutter". These results were achieved by comparing the composite traffic and clutter echoes to a clutter map obtained by the same apparatus in the absence of traffic. Speed was measured by tracking individual vehicles over successive antenna scans (1.7 seconds apart). However, this method of determining traffic speed may encounter difficulties in congested traffic situations (i.e., when there are multiple unresolved vehicles at the same range) or when there are "crossing targets" (i.e., vehicles which switch their relative positions between scans). Doppler techniques for speed determination are therefore preferable. But the type of radar employed in that experiment, with its magnetron transmitter, was operated in a non-coherent mode; that is, it did not preserve the microwave carrier phase-angle relationships over successive pulse transmissions. Therefore, it was unable to use Doppler techniques, which require coherent transmissions and coherent processing of the received echoes, and which are generally preferable for suppressing ground clutter. Doppler techniques have been, and continue to be, widely employed by radar designers for other radar applications.

Although not specifically intended for civilian traffic monitoring over metropolitan regions, other types of ground surveillance radar systems or apparatus are known in the art which employ certain techniques useful for the preferred embodiments of the present invention. These other types of radar systems include radars for airport surface detection equipment (ASDE) and for military airborne reconnaissance. U.S. Pat. No. 5,334,982 to Owen discloses a system for identifying aircraft and other vehicles on the surface of an airport. This system includes a radar which utilizes both a beacon interrogation return (that is, a return signal generated by an active transponder aboard a vehicle) and a conventional "skin" echo (that is, the radar echo resulting from reflection of the radar energy). An example of a skin-echo radar for airport surface surveillance is the ASDE-3 radar system cited in the latter patent; this radar system operates in the Ku-band portion of the electromagnetic spectrum and utilizes well-established radar techniques, such as: a rotating antenna, a phase-coherent transmitter employing a traveling-wave tube, advanced coherent signal processing algorithms for clutter rejection, a high-resolution waveform, and circularly-polarized transmissions for the suppression of clutter echoes caused by rainfall (rain clutter). (The polarization of an electromagnetic field describes the orientation of the electric field vector as a function of time.)

With respect to related-art airborne reconnaissance radar, this type can be broadly divided into two categories, namely radar for manned aircraft and radar for pilotless aircraft, the latter expression meaning that there are no human operators aboard. A well-known example of the first category is the JSTARS system (see, for example, Haystead, Defense Electronics, July, 1990, pp. 31–40) used for surveillance of armored surface units and other military targets. This system contains a large side-looking X-band radar installed aboard a manned aircraft of the Boeing-707 class. The radar includes a phase-coherent transmitter employing traveling-wave tubes, and a phased-array antenna which is electronically-steered in the azimuth angle dimension and mechanically rotated in the elevation angle dimension. (A phased-array antenna permits rapid, quasi-instantaneous electronic beam steering, rather than mechanical beam steering, in at least one dimension.) The JSTARS radar can operate in either a synthetic aperture radar (SAR) mode, or a Doppler-based moving target indication (MTI) mode which helps to reject the stationary ground clutter. (These modes include methods to compensate for the aircraft motion.) The radar also includes high-resolution transmitted waveforms useful for target isolation and identification. In the JSTARS system, the radar transmissions are linearly polarized and the echoes are received at the same polarization.

As for pilotless aircraft, often termed "unmanned air vehicles" (UAVs), such aircraft are gaining increasing attention as a safe, efficient, and relatively inexpensive approach for conducting surface surveillance using various on-board sensor systems, including microwave radar. A recently-initiated program, known as "Tier-2-Plus", specifies, for future implementation, an on-board radar with both SAR and MTI capabilities without specifying any particular embodiment or choice of radar components (See, for example, Entzminger, Address to the Association of Unmanned Vehicle Systems, Mar. 24, 1994.). A similar, somewhat earlier pilotless system, termed "Tier-2" (Fulghum, Aviation Week & Space Technology, Nov. 28, 1994, pg. 62), includes an on-board side-looking radar. The suppression of interfering ground clutter is more difficult in side-looking airborne radar, in contrast with radar viewing the surface along the aircraft's ground track. Finally, although not specified for surface surveillance, U.S. Pat. No. 5,097,267 to Raviv teaches a radar system aboard a pilotless aircraft, wherein the radar is characterized as an "airborne early warning" radar, which is a term customarily applied to an airborne radar for detecting hostile aircraft. The latter patent comprises a fuselage-mounted, side-looking radar with a phased-array antenna.

In view of the foregoing discussion, it is clear that there exists a long-standing need for an improved approach for more effective traffic monitoring.

SUMMARY OF THE INVENTION

Therefore, an object of the present invention is to provide a method and system for remote monitoring of vehicular traffic in a wide metropolitan area, in a cost-efficient way, which is largely immune from vandalism and does not entail disruption of traffic during installation and maintenance. Another object of the invention is to provide coverage of a wide area with the use of only a small number of wide-viewing sensors, in lieu of the large number of localized sensors required in prior methods. A further object of the invention is to provide a monitoring system wherein the selection of roadway sections to be monitored can be varied as traffic conditions change and wherein installations in different metropolitan regions can be readily tailored to correspond to the roadway configurations. A further object of the invention is to provide round-the-clock reliable traffic monitoring, regardless of adverse weather conditions such as rain, fog, clouds, or smog.

These and other objects are met in the present invention, which comprises a method and system for remote all-weather monitoring of civilian road traffic over a wide metropolitan region using one or more unmanned radar stations situated at elevated sites such as towers, tall buildings, elevated terrain, aerostats, or pilotless aircraft, to scan a beam across the entire surveillance region and/or to examine selected "high-resolution" subregions, for the purpose of measuring Doppler velocity spectra of the traffic within a plurality of range-resolved locations. The beam scanning and high-resolution examination may be performed by a phased-array antenna containing solid-state transmit/receive modules. The resulting Doppler data are separated from the background clutter and further processed in representative cases, and transmitted to a traffic control center. The Doppler data are further compensated for the relative view angles between the radar line-of-sight and the direction of the pertinent section of roadway.

Further objects and advantages of the present invention will be apparent from drawings and the ensuing detailed description.

DESCRIPTION OF THE DRAWINGS

The present invention may be better understood by reference to the accompanying drawings, in which.

DESCRIPTION OF THE PREFERRED EMBODIMENTS

Figure 1:
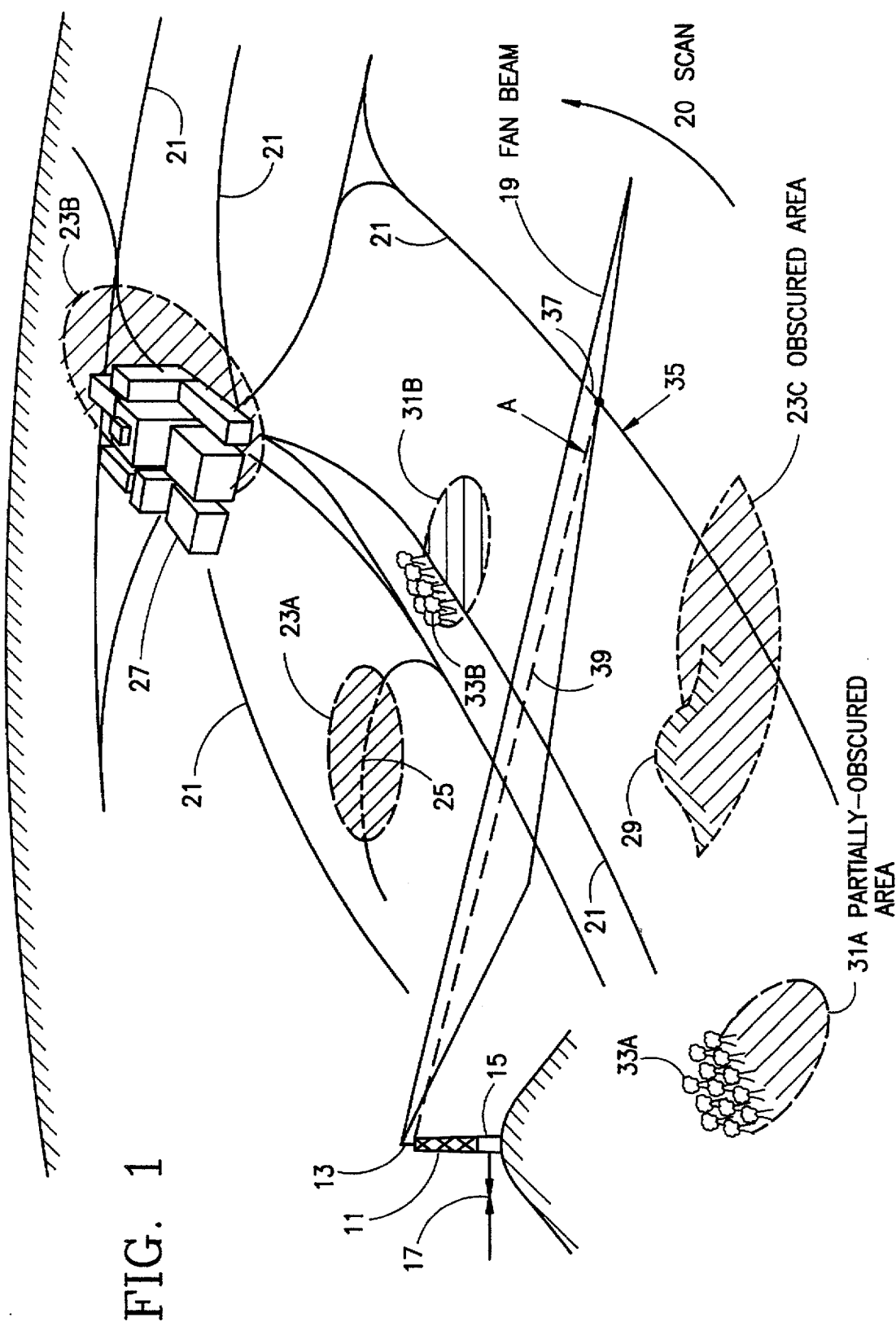
FIG. 1 illustrates the present invention monitoring the traffic conditions in a wide metropolitan area.

FIG. 1 depicts a wide metropolitan area, including a plurality of roads to be monitored, and means to view the roads from a fixed site, for example, a tower 11. Alternative fixed elevated sites (not shown) could be, for example, hills or elevated landforms, or tall buildings. An antenna 13 of a radar is situated on, or near the top of, the tower of FIG. 1; other portions 15 of the radar, as well as the prime power source, can be situated at the base of the tower. The radar is preferably unmanned and a data link 17 conveys the radar data to a traffic control center and communicates commands from the control center which stipulate radar operating parameters. The antenna forms a vertical fan beam 19—that is, a beam which illuminates a narrow strip on the ground extending radially from the radar source, or in other words, wherein the beam is considerably wider in elevation angle than in azimuth angle. The vertical fan beam thus enables a large span in the range direction on the land surface to be included for any beam position. The illustrated beam scans 20 a metropolitan region containing a network of roadways 21. By employing the microwave portion of the electromagnetic spectrum in the preferred embodiment, the surveillance is substantially unaffected by adverse weather conditions, such as rain, fog, clouds, or smog.

FIG. 1 also shows numerous obscured areas 23A,B,C not directly observable by the radar, such as tunnels 25, areas occluded by structures 27 (especially densely-spaced urban structures), or areas blocked by hills and other terrain features 29. Additionally, partially-obscured areas 31A,B can result from occlusion by foliage 33A,B, to an extent determined, among other factors, by season, foliage type and moisture content, and radar parameters such as frequency, polarization, and incidence angle of the beam. Since these areas are not directly observable from the primary observation site 11, if observation of these obscured areas is important, the preferred embodiment may include supplementary sensors, such as a limited number of roadside and road-embedded sensors discussed previously and/or additional appropriately-situated radar sites. It should be noted a that a view angle (A) 35 is defined as the angle formed by the direction of a particular stretch of roadway 37, the direction of which is known in advance, and the radar line-of-sight 39 to that location.

Figure 2:
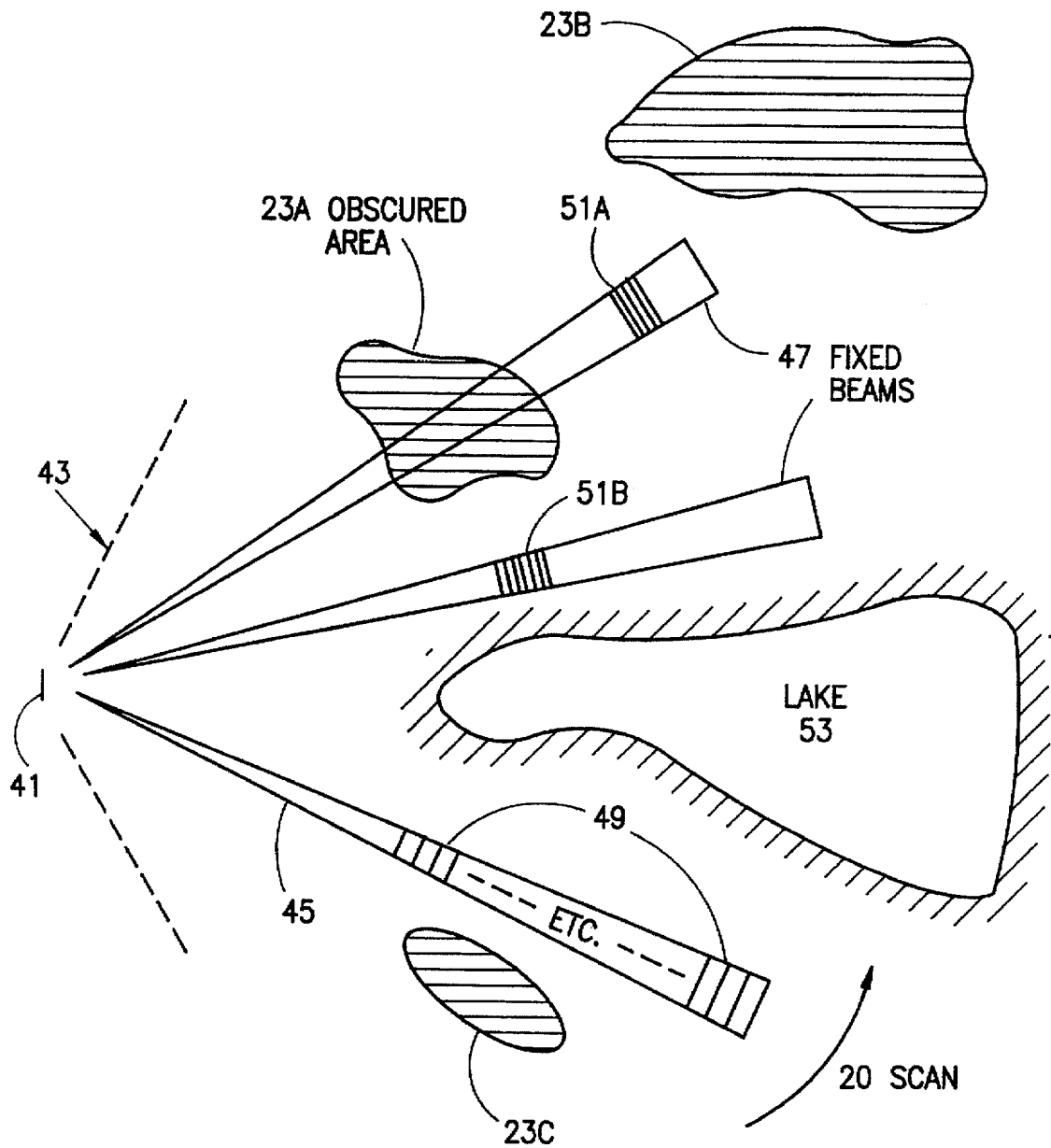
FIG. 2 illustrates examples of radar beam patterns that may be used in the present invention.

With reference to FIG. 2, a single radar antenna in this preferred embodiment comprises an electronically-steered phased-array design with one or more array faces 41 oriented in desired directions. The antenna transmits and directs a beam of electromagnetic energy and receives signals of reflected electromagnetic energy. Alternatively, separate transmit and receive antennas may be employed. A single array face typically creates an azimuthal field-of-view 43. The flexibility of a phased-array antenna is illustrated here by depicting both a scanning beam 45 and fixed beams 47, all of which can be formed simultaneously. The former, which here employs range-resolved locations (known as "range cells") 49 with normal resolution, provides an overview of traffic in the unobscured portions of the field-of-view, with a "revisit" time (scan period) of, typically, 60 seconds. The fixed beams, which in this illustration employ high-resolution range cells 51A,B, provide more-frequent detailed examinations of locations of special interest by dwelling on these locations until commanded to other locations. The range cells, whether associated with fixed or scanning beams, can be adjacent, or separated, or in separated groups of adjacent cells, and their locations in range can vary as a function of beam position. Also, it will be apparent that areas of little or no interest, such as lakes 53 or patches of wilderness, can be skipped by the scanning beam, thereby permitting more frequent revisits to areas of interest.

Figure 3:
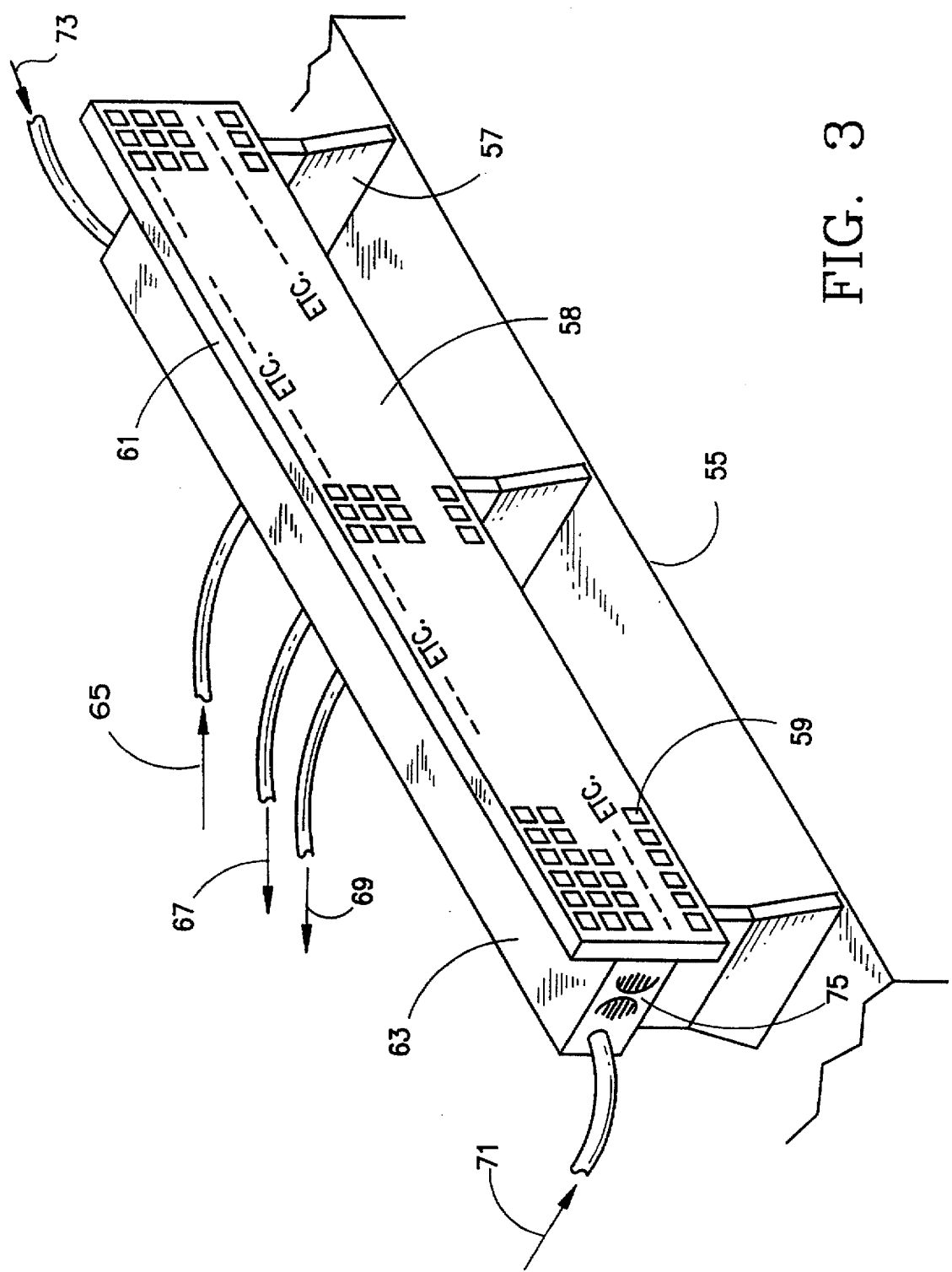
FIG. 3 illustrates a phased-array antenna used in the preferred embodiment for a fixed site.

The preferred embodiment employs a solid-state radar, in which the final stage of amplification of the energy to be transmitted consists of solid-state components. In particular, a solid-state "active aperture" phased-array configuration is preferred, removing the need for moving parts in the radar and thereby contributing significantly to overall reliability and reduced maintenance. (An active aperture configuration is one wherein solid-state transmit/receive modules are distributed across the antenna aperture.) The X-band is the preferred frequency band for fixed-site operation in this embodiment. FIG. 3 depicts an active aperture antenna for a fixed-site embodiment, wherein an array structure is shown mounted on the floor 55 of a fixed-site platform using rigid support footings 57. The array face 58 is populated by numerous radiating elements 59 capable, in this embodiment, of transmitting and receiving circular polarization signals. The radiating elements in each column are grouped by a vertical beamforming network, housed as shown 61, with appropriate phase trimming to shape the unvarying elevation pattern of the fan beam. A single row of solid-state transmit/receive (T/R) modules, one module for each column of elements, is housed 63 just behind the array face and vertical beamforming network. Each module includes transmit output amplifier stages, a low-noise receive pre-amplifier and one or more subsequent amplifier stages, an isolator to protect the receive circuitry from the transmitted energy, remotely-controlled electronic phase shifters for azimuthal steering of the beams and for controlling the sense (clockwise or counterclockwise) of the selected received circular polarization, and storage devices to maintain the DC current levels of the DC supply. The low-level input for the transmit signal 65 is distributed to the T/R modules by way of a horizontal beamforming network, housed with the modules. This beamforming network includes amplitude tapering across the aperture applied to the received signals by differentially attenuating the output of each T/R module. This is done in order to minimize the level of the antenna "sidelobes", thereby minimizing the effect of clutter echoes received through these sidelobes. The horizontal beamforming network also separates the received amplified signal into a sum signal output 67, which constitutes the combined array output, and a difference signal output 69, which divides the two horizontal halves of the array and subtracts their outputs from each other. The difference signal, although not essential for the present embodiment, is useful for "beam splitting", which is a technique, known in the radar art, for precisely locating the angular position of isolated, range-resolved targets; for the present application, this technique can be employed in conjunction with high-resolution waveforms in order to distinguish traffic among roadways which run approximately parallel and are very close to one another. The input digital signals 71 to control the array include beam steering commands, polarization selection commands, signal attenuation settings, and other commands for array testing and aperture tapering (for variable control of the beam sidelobes). DC power 73 for the modules is provided from a DC power supply situated either on the platform or below; note, in this regard, that the use of solid-state final amplifiers permits the use of low DC voltage levels, in contrast with vacuum-tube transmitters, and this adds to the reliability and ease of maintenance of the configuration. It is expected that naturally-circulating air cooling of the modules will suffice; the air cooling ducts 75 are included for this purpose.

Not shown in detail in the drawings is the use of orthogonal polarization reception for the rejection of rain clutter, since this technique is well documented elsewhere. (See, for example, Nathanson, "Radar Design Principles", Second Ed., 1990, pp. 155–158.) Briefly stated, the scattering from radar targets, in general, can be decomposed into principal polarization and orthogonal polarization echoes (e.g., for circular polarization, counterclockwise and clockwise rotation, respectively, of the echo electric field vector when the transmit polarization is clockwise). For the orthogonal polarization, there is very little reflection from most types of rainfall while the traffic echoes are expected to be only mildly attenuated. Thus, in practice, principal receive polarization would be selected in clear weather while orthogonal receive polarization would be selected in rainfall, particularly in heavy rainfall. The radar may therefore be designed with sufficient sensitivity to compensate for the attenuation of the traffic echoes in the latter case. The technique can also be implemented with linear orthogonal polarization reception (e.g., horizontal receive polarization when the transmit polarization is vertical, or vice versa); however, circular polarization is preferred for these embodiments because of its superior target scattering characteristics.

Figure 4:
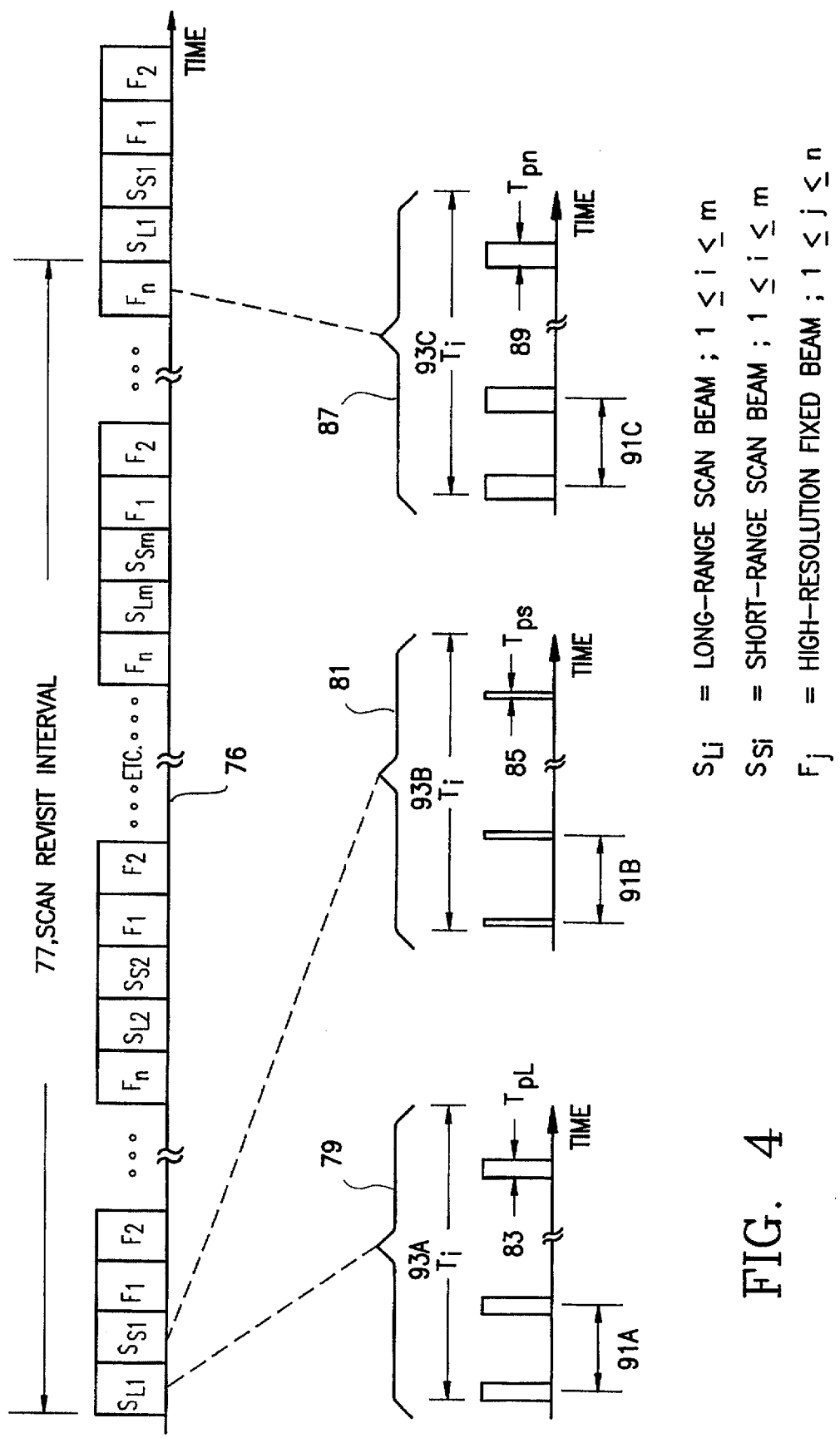
FIG. 4 illustrates typical waveforms and waveform templates (waveform groups) for the preferred embodiments.

Referring to FIG. 4, a suitable waveform template 76, which describes the sequence of transmission modulations for successive beam positions, is illustrated for a single scanning beam, with "m" scan positions, and "n" high-resolution fixed beams. All waveforms are of the coherent pulse-Doppler type, with suitable frequency modulation within each pulse, as discussed below. The scan revisit time 77 refers to the time period between successive scans over the surveillance region. For any particular scan beam position, both a long-range waveform 79 and a short-range waveform 81 may be employed; the former uses a wider pulse width, $T_{pL}$, 83 to maximize detection sensitivity at the longest range to be monitored, and the latter uses a very short pulse width, $T_{pS}$, 85 for coverage of the closer ranges obscured by the transmission of the long-range waveform. For each of the fixed beam waveforms 87, the pulse width, $T_{pn}$, 89 is maximized for maximum sensitivity without self-obscuration of the subsection examined by the transmitted pulse.

Referring still to FIG. 4, both the pulse spacings, 91A,B, C, which are equal to the reciprocal of the Pulse Repetition Frequency (PRF), and the coherent integration intervals, $T_i$, 93A,B,C are illustrated as being the same for all waveforms. Typical values, for fixed-site X-band operation, are approximately 5 kilohertz and 51 milliseconds for the PRF and $T_i$, respectively. This value for PRF corresponds to an ambiguous range of 30 kilometers and an ambiguous Doppler velocity interval (at X-band) of approximately 75 meters per second (+/− 84 mph). As commonly used in military airborne radar, such ambiguous values greatly complicate waveform design and require such measures as multiple staggered PRFs because of the longer ranges and higher speeds of many military targets. Fortunately, for this application, these values adequately encompass the range/Doppler domain of interest. Ambiguous spurious echoes (from targets at ranges greater than 30 kilometers in this example) are greatly attenuated and may appear at locations where roadways are known not to exist; thus, it is expected that such "ghost" echoes can usually be screened out. The same favorable considerations often apply to multipath echoes, which refer to target echoes experiencing intermediate secondary reflections from buildings or other large scatterers and thereby resulting in "ghost" signals which are received in addition to the desired direct line-of-sight echoes from the targets of interest.

Yet another consideration related to FIG. 4 is the frequency modulation (not shown) necessary to produce the desired range resolutions using "pulse compression" (see below). For the scan waveforms, which here employ normal resolution, a modulation bandwidth (identical for each pulse) of the order of two megahertz is representative, which corresponds to a resolution of approximately 100 meters. For the high-resolution fixed-beam pulses, a relatively wideband modulation, of approximately 100 megahertz bandwidth, is suitable, corresponding to a resolution of approximately two meters.

The received pulse-Doppler echoes can be processed in conventional ways. Present-day practice favors the use of digital processing, preceded by coherent analog-to-digital conversion of the received signals. The digital processing includes pulse compression (which refers to the process of forming a sharp range response commensurate with the intra-pulse frequency modulation bandwidth), amplitude tapering of the received pulse train in order to reduce the effects of clutter signals that may be present in the sidelobes of the Doppler response (analogous to the antenna beam sidelobes discussed previously), and fast-Fourier transform processing to derive the desired Doppler spectra. This digital processing is performed for the sum signal output 67 of the antenna for every range cell for which traffic data are to be obtained, provided that the capacity of the processing circuitry is not exceeded. The same digital processing is performed concurrently for the difference signal output 69 of the antenna, wherever the latter is desired, with subsequent comparison with the sum signal to accomplish the aforementioned beam splitting.

Figure 5:
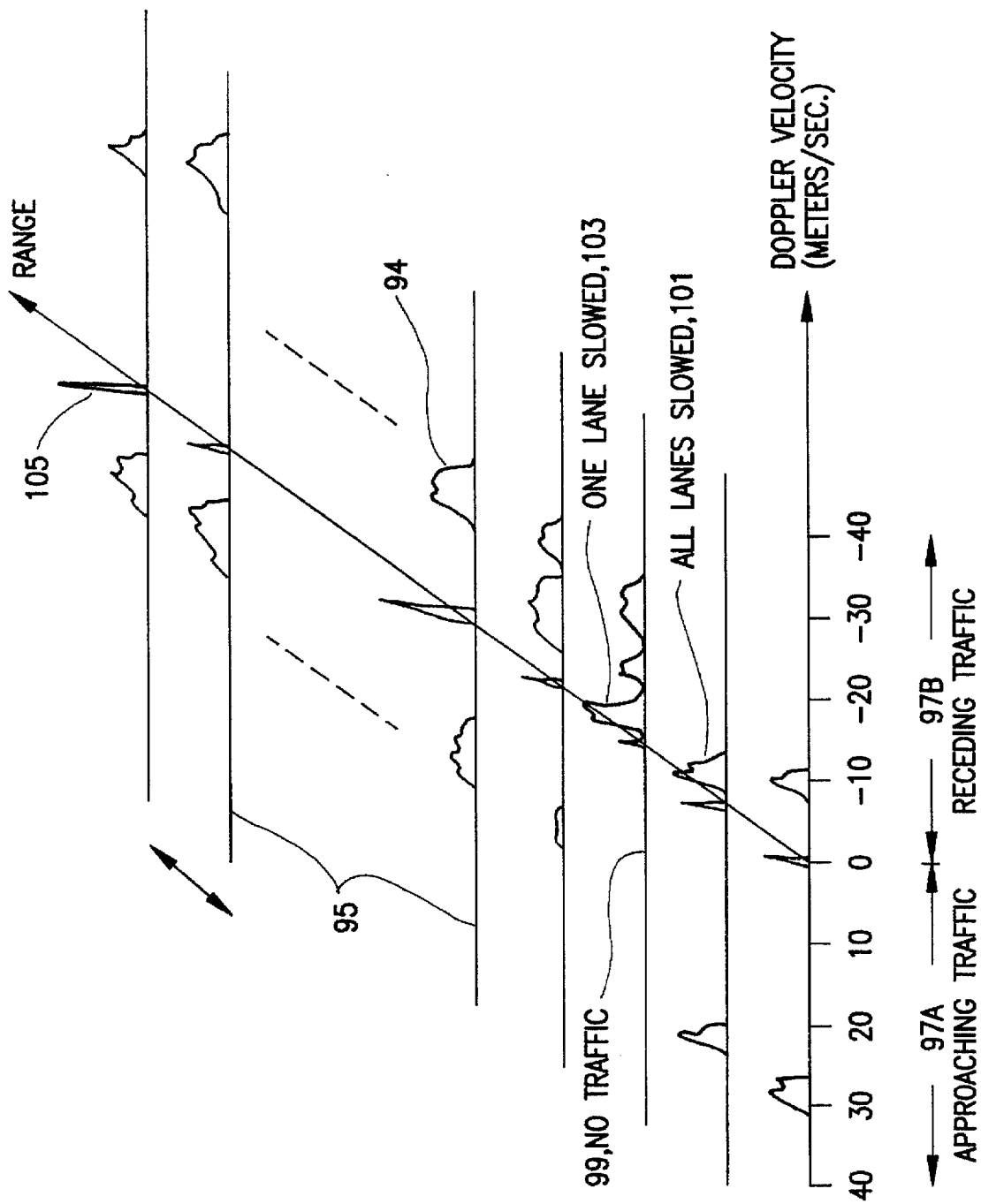
FIG. 5 illustrates Doppler spectra for multiple range cells along a section of roadway.

The resulting Doppler spectra 94, the magnitude of which are proportional to the received echo energy content at each Doppler frequency component, are illustrated in FIG. 5 for a group of range cells along a typical stretch of roadway. A separate spectrum is obtained for each of the range cells 95. Typical values of Doppler velocity are scaled along the abscissa. (Contrary to convention, positive and negative Dopplers are represented in FIG. 5 on the left and right, respectively, corresponding to a desired visualization of the directions of approaching and receding traffic 97A,B along roadways in the United States.) By way of illustration, FIG. 5 depicts a range cell containing no approaching traffic 99, a range cell in which all receding traffic lanes are slowed 101, and a range cell in which only one receding traffic lane is slowed 103. It should be noted that to determine the actual velocity of the vehicles from the Doppler velocity (which is the velocity component along the radar's line-of-sight 39) the Doppler velocity is divided by cos A, where A is the view angle 35 between the line-of-sight and the stretch of roadway 37. In the preferred embodiment, a database comprising a list of roadway sections and the cosines of the view angles 35 is maintained at either the radar site or the traffic control center, and used to correct traffic densities and to convert the Doppler velocities to traffic velocities for display or for performing further statistical analysis.

Referring still to FIG. 5, ground clutter spectral components 105, confined to a narrow region around zero Doppler, are depicted. To prevent these from spilling over into the components representing moving traffic, the previously-mentioned Doppler sidelobes must be kept at sufficiently low levels; the stationary clutter can then be adequately suppressed and separated from the moving traffic spectra. Additional minimization of especially strong clutter components can be achieved by obtaining a range-Doppler clutter map in the vicinity of such strong clutter, thereby enabling the subtraction of any clutter spillover, or residue, from the measured traffic Doppler spectra. Such a clutter map is best obtained by operating the radar during periods of light traffic, averaging a large number of the measured spectra, and storing the resulting map in the radar's processor. It should also be noted that traffic which is totally stalled is difficult to separate from the stationary ground clutter by Doppler techniques; however, such situations can readily be detected and reported since the traffic will cause a substantial increase in the zero Doppler spectral component because of the likely presence of a large number of reflecting vehicles in these cases.

Figure 6:
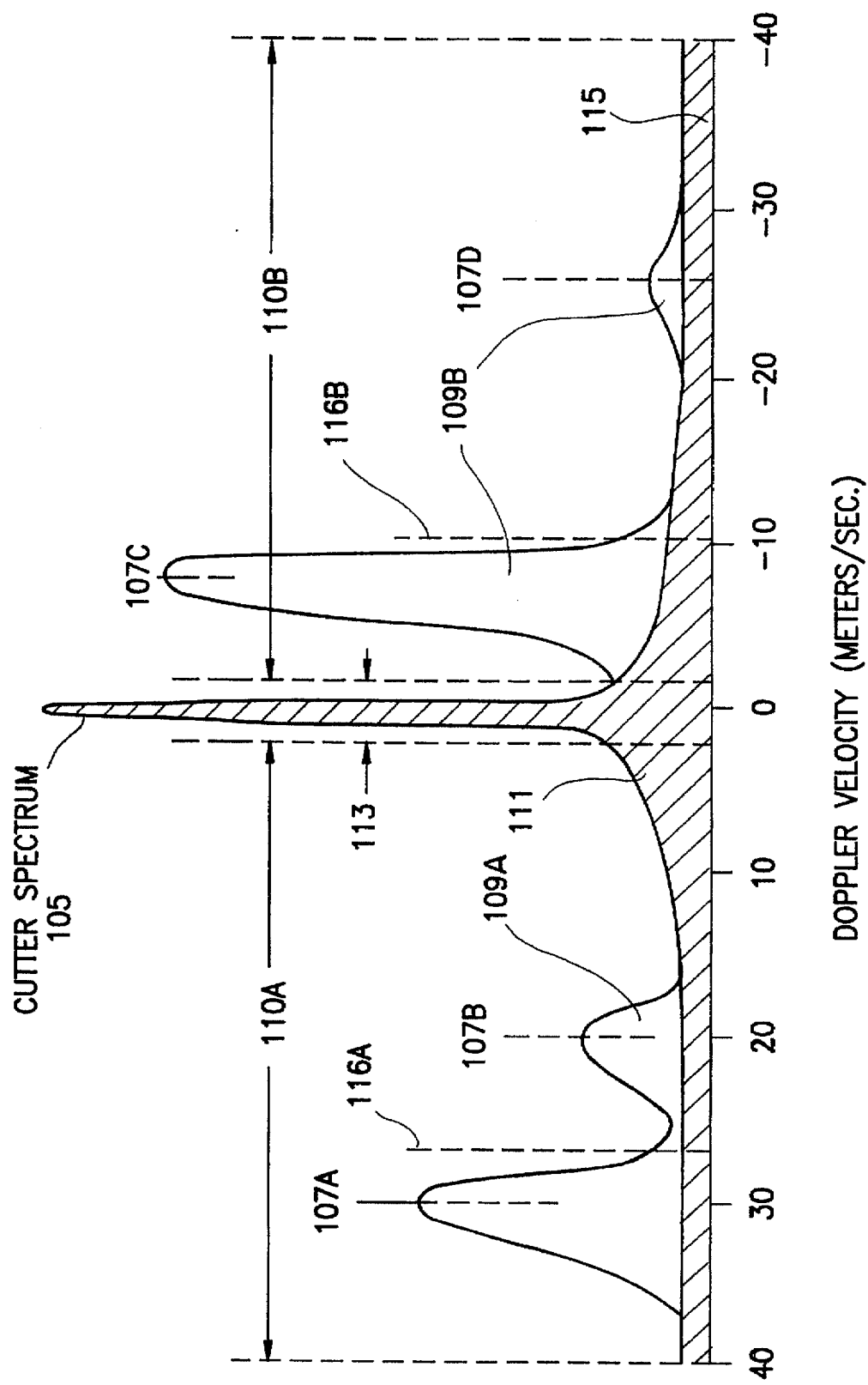
FIG. 6 illustrates outputs derived from individual Doppler spectra in a typical range cell in the present invention.

While the complete spectral data may be conveyed to a traffic control center or to other users of the data, in many instances it will suffice to extract certain outputs from the spectra and to communicate these via a data link, thereby minimizing the required capacity of the data link. Such outputs may include, as illustrated in FIG. 6, the salient Doppler velocity components 107A,B,C,D, (i.e., the Doppler velocities corresponding to distinct maxima of the spectra), density (measured in vehicles per meter of range), and traffic volume (measured in vehicles per second) in any range cell. The density, for either approaching or receding traffic, can be estimated from the respective areas 109A,B (in mathematical terms, the definite integrals) under the spectra and in the span 110A,B between specified Doppler velocity bounds, with an exclusion area 111 subtracted. The exclusion area, shown by the shaded region in FIG. 6, is comprised of a zone 113 to exclude the major portion of the clutter spectrum and a residue region 115 comprised of clutter sidelobes and the averaged receiver noise level (the latter being essentially time-invariant and uniform as a function of Doppler velocity). The remaining unshaded areas in FIG. 6 represent the received echo power from the totality of the bounded non-stationary traffic within the range cell and are therefore indicative of the density of moving traffic therein. The estimated traffic density (measured in vehicles per meter of roadway) can be derived from this measured density by multiplying the latter by cos A, where A is the previously-defined view angle 35. The traffic volume contained within the specified Doppler velocity bounds can be estimated from the product of measured density and mean Doppler velocity 116A,B.

Additional traffic data can be derived from the high-resolution modes. The use of the correspondingly small range cells minimizes the clutter echo power within the cells, thereby enhancing the observability of individual vehicles even when they are stationary. Thus, traffic incidents such as accidents can be probed with the high-resolution waveform. For example, the number of vehicles involved in an incident can be counted and rapidly reported. Further, since the range resolution for this waveform is typically smaller than the length of most vehicles, classification of vehicle types by "signature analysis" (e.g., analysis of the echo structure as a function of the ranges encompassing a vehicle) may be possible.

Figure 7:
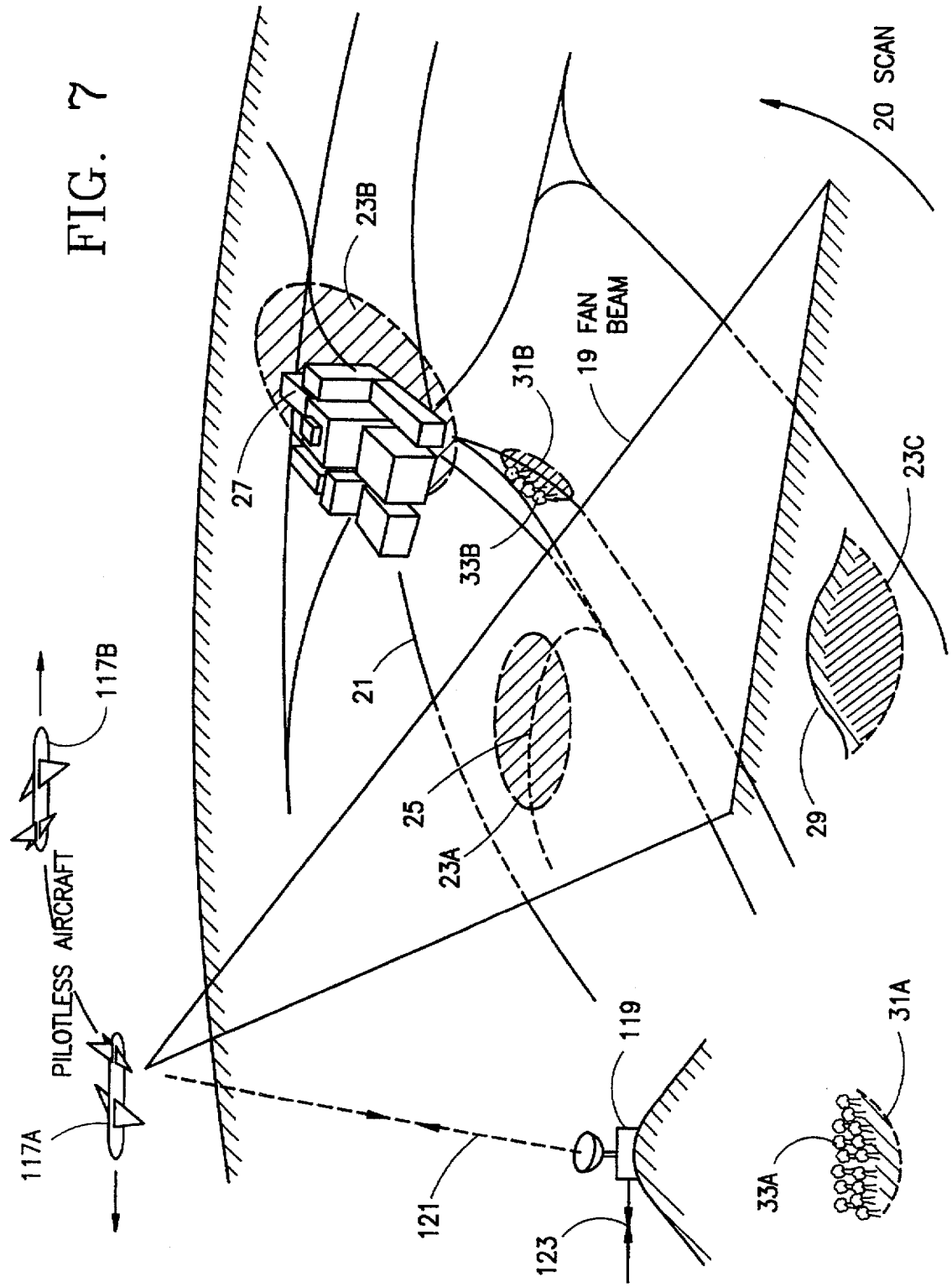
FIG. 7 illustrates another embodiment of the present invention monitoring the traffic conditions in a wide metropolitan area.

In a second embodiment of the present invention, FIG. 7 depicts regional traffic monitoring from a pilotless aircraft 117A, in this case a free-flying high-endurance platform cruising above the airspace normally reserved for civilian air traffic. A typical cruising altitude is 20 kilometers (approximately 65,000 feet), which corresponds to the anticipated capability of certain high-endurance platforms which are under development. (See, for example, Fulghum, Aviation Week & Space Technology, Oct. 4, 1993, pg. 27.) As a consequence of monitoring from such a high altitude, the traffic observations can be conducted over a broader area and at steeper beam depression angles than possible with the fixed-site embodiment. Moreover, the steeper depression angles will generally result in less line-of-sight blockage, previously discussed, resulting in relatively smaller obscured areas 23A,B,C and 31A,B.

Referring still to FIG. 7, it is preferred to install an active aperture near either the leading edge or trailing edge of the aircraft's wing, thereby centering the field-of-view around the path of the aircraft. This is preferred over the side-looking configurations cited in the related art since, as is known to those skilled in airborne radar design, viewing along the aircraft's path minimizes undesirable artificial spreading of the ground clutter spectrum induced by the aircraft's motion. It will be apparent from a consideration of the field-of-view geometry that, since continuous traffic monitoring is desired, in this preferred embodiment at least two aircraft 117A,B can be aloft simultaneously. In addition, at least one other aircraft can be standing by on the ground and ready to replace an aircraft which is nearing its endurance limit.

An alternative pilotless aircraft platform is an aerostat (not shown), i.e., an elevated lighter-than-air platform tethered to the ground. However, due to airspace restrictions in metropolitan regions, the possibilities for useful deployments of an aerostat for traffic monitoring may be limited.

For the pilotless aircraft embodiments of the present invention, the implementation approaches discussed earlier for the fixed-site embodiments, such as the radar architecture, waveforms, and preferred processing steps, apply similarly to the embodiments using a pilotless aircraft platform, except for the following differences:

1) The preferred frequency band is the C-band, for which the carrier wavelength is approximately twice that for the X-band, because the C-band allows lighter weight radar equipment, and because it permits the removal of undesired ambiguities that may occur due to the greater viewing range of the pilotless aircraft.

2) In comparison with the fixed-site X-band embodiment, the preferred waveforms for this embodiment employ a PRF of approximately 2.5 kilohertz and a coherent integration interval 93A,B,C of approximately 10 milliseconds as representative design values.

3) The motion of the pilotless aircraft must be taken into account in performing the radar measurements. Corrections must be made for the Doppler shift and range-cell displacements arising from the translation of the aircraft as it cruises along its path. Additional corrections are needed to maintain the antenna beam pointing directions in the presence of platform pitch, yaw, and roll motions. Various of these corrections are made electronically using, in this preferred embodiment, motion sensing by an on-board inertial navigation system.

With reference once more to FIG. 7, this pilotless aircraft embodiment may use an unattended ground station 119 to communicate with the aircraft, preferably via a direct and dedicated radio data link 121. To minimize the weight on-board the aircraft, the signal processing and output parameter estimation may be performed at the ground station, using an unprocessed digital data stream transmitted from the aircraft over the radio data link after analog-to-digital conversion aboard the aircraft. The parameters derived from the processed data are then conveyed to a traffic control center or to other users via a separate lower-capacity data link 123.

It should be clear from the foregoing discussion that numerous variations of the principal embodiments may be devised which will also come under the scope of the present invention. For example, there may be a plurality of fixed and/or moving surveillance sites which operate simultaneously to view substantially the same metropolitan area in order to ensure different perspectives of the roadways; and a central location may be employed to combine the data arriving from the plurality of fixed and/or moving sites to obtain the desired traffic data with greater precision and completeness than obtainable from only a single surveillance site. Also, any of the fixed and/or moving surveillance sites having obscured viewing regions may be supplemented by additional measurements made by localized sensors as described above. Further, the processing of the radar signals, including clutter removal, Doppler extraction, compensation for roadway orientation (employing the cosine of the angle between the line-of-sight and the roadway direction), and extraction of desired traffic parameters, may be performed entirely at the observation site(s), or at a traffic control center, or partially at the observation site(s) and the traffic control center (and/or other processing sites), as considered optimal for a given installation. Thus, the possible embodiments that come under the scope of the present invention should not be limited by the foregoing discussion, but only by the claims appended herewith.

What is claimed is:

1. A method for monitoring civilian vehicular land traffic at a plurality of selectable roadway sections, said method comprising:

a. directing and transmitting beams of electromagnetic energy from at least one fixed elevated site towards selected roadway sections; for each said roadway section using a selected carrier frequency and a selected modulation;

b. receiving at said at least one fixed elevated site signals of electromagnetic energy comprising vehicle echoes and other object echoes; and c. processing said signals to separate said vehicle echoes from said other object echoes and to produce measurements of range and Doppler velocity of vehicles in said selected roadway sections.

2. The method of claim 1 wherein said beam of electromagnetic energy comprises a vertical fan beam, which includes a plurality of range cells on the land surface.

3. The method of claim 1 including receiving said signals with a selected polarization to improve discrimination of said vehicle echoes from rain clutter echoes.

4. The method of claim 1 further comprising frequency-modulating said electromagnetic energy over a frequency span sufficiently wide to range-resolve individual vehicles within selected subsections of said selected roadway sections, thereby permitting vehicle classification and detailed observation of traffic incidents.

5. The method of claim 1 further comprising deriving from said measurements of range and Doppler velocity at least one quantitative output corresponding to traffic parameters including:
   a. density of traffic within selected range cells and within a selected span of velocities;
   b. volume of traffic within selected range cells and within a selected span of velocities; and
   c. salient velocities of traffic within selected range cells.

6. The method of claim 1 further comprising processing of received difference signals to derive estimates of angular locations of resolved vehicles.

7. The method of claim 1 wherein said at least one fixed elevated site comprises at least one of:
   a. a building;
   b. a tower; and
   c. a hill or other elevated landform.

8. A method for monitoring civilian vehicular land traffic at a plurality of selectable roadway sections, said method comprising:
   a. using a solid-state radar, directing and transmitting beams of electromagnetic energy from at least one fixed elevated site towards selected roadway sections; for each said roadway section using a selected carrier frequency and a selected modulation; wherein said beam is formed by an electronically-steered phased-array antenna;
   b. receiving at said at least one fixed elevated site signals of electromagnetic energy comprising vehicle echoes and other object echoes; and
   c. processing said signals to separate said vehicle echoes from said other object echoes and to produce measurements of range and Doppler velocity of vehicles in said selected roadway sections.

9. The method of claim 8 wherein said beam of electromagnetic energy comprises a vertical fan beam, which includes a plurality of range cells on the land surface.

10. The method of claim 8 including receiving said signals with a selected polarization to improve discrimination of said vehicle echoes from rain clutter echoes.

11. The method of claim 8 further comprising frequency-modulating said electromagnetic energy over a frequency span sufficiently wide to range-resolve individual vehicles within selected subsections of said selected roadway sections, thereby permitting vehicle classification and detailed observation of traffic incidents.

12. The method of claim 8 further comprising deriving from said measurements of range and Doppler velocity at least one quantitative output corresponding to traffic parameters including:
   a. density of traffic within selected range cells and within a selected span of velocities;
   b. volume of traffic within selected range cells and within a selected span of velocities; and
   c. salient velocities of traffic within selected range cells.

13. The method of claim 8 further comprising processing of received difference signals to derive estimates of angular locations of resolved vehicles.

14. The method of claim 8 wherein said at least one fixed elevated site comprises at least one of:
   a. a building;
   b. a tower; and
   c. a hill or other elevated landform.

15. A system for monitoring civilian vehicular land traffic at a plurality of selectable roadway sections, said system comprising:
   a. a solid-state radar including an electronically-steered phased-array antenna for directing and transmitting beams of electromagnetic energy from at least one fixed elevated site towards selected roadway sections, using for each said roadway section a selected carrier frequency and a selected modulation;
   b. means for receiving at said at least one fixed elevated site signals of electromagnetic energy comprising vehicle echoes and other object echoes; and
   c. means for processing said signals to separate said vehicle echoes from said other object echoes and to produce measurements of range and Doppler velocity of vehicles in said selected roadway sections.

16. The system of claim 15 wherein said beam of electromagnetic energy comprises a vertical fan beam, which includes a plurality of range cells on the land surface.

17. The system of claim 15 including means for receiving said signals with a selected polarization to improve discrimination of said vehicle echoes from rain clutter echoes.

18. The system of claim 15 further comprising means for frequency-modulating said electromagnetic energy over a frequency span sufficiently wide to range-resolve individual vehicles within selected subsections of said selected roadway sections, thereby permitting vehicle classification and detailed observation of traffic incidents.

19. The system of claim 15 further comprising means for deriving from said measurements of range and Doppler velocity at least one quantitative output corresponding to traffic parameters including:
   a. density of traffic within selected range cells and within a selected span of velocities;
   b. volume of traffic within selected range cells and within a selected span of velocities; and
   c. salient velocities of traffic within selected range cells.

20. The system of claim 15 further comprising means for processing of received difference signals to derive estimates of angular locations of resolved vehicles.

21. The system of claim 15 wherein said at least one fixed elevated site comprises at least one of:
   a. a building;
   b. a tower; and
   c. a hill or other elevated landform.

22. A method for monitoring civilian vehicular land traffic at a plurality of selectable roadway sections, said method comprising:
   a. using a solid-state radar, directing and transmitting beams of electromagnetic energy from at least one pilotless aircraft towards selected roadway sections using a selected carrier frequency and a selected modulation, wherein said beams are formed by an electronically-steered phased-array antenna;
   b. receiving at said at least one pilotless aircraft signals of electromagnetic energy comprising vehicle echoes and other object echoes;

c. determining and substantially controlling the position and motion of said at least one pilotless aircraft; and d. processing said signals to separate said vehicle echoes from said other object echoes and to produce measurements of range and Doppler velocity of vehicles in said selected roadway sections, wherein said processing includes any necessary correction for the position and motion of said at least one pilotless aircraft.

23. The method of claim 22 including providing data communications between a ground station and said at least one pilotless aircraft, for the purpose of controlling the position and motion of said at least one pilotless aircraft and the operation of said solid-state radar and for receiving from said at least one pilotless aircraft data including at least one of the following:

a. unprocessed data corresponding to said signals;

b. partially processed data derived from said signals; and c. processed data corresponding to said measurements of range and Doppler velocity.

24. The method of claim 22 wherein said beam of electromagnetic energy comprises a vertical fan beam, which includes a plurality of range cells on the land surface.

25. The method of claim 22 including receiving said signals with a selected polarization to improve discrimination of said vehicle echoes from rain clutter echoes.

26. The method of claim 22 further comprising frequency-modulating said electromagnetic energy over a frequency span sufficiently wide to range-resolve individual vehicles within selected subsections of said selected roadway sections, thereby permitting vehicle classification and detailed observation of traffic incidents.

27. The method of claim 22 further comprising deriving from said measurements of range and Doppler velocity at least one quantitative output corresponding to traffic parameters including:

a. density of traffic within selected range cells and within a selected span of velocities;

b. volume of traffic within selected range cells and within a selected span of velocities; and c. salient velocities of traffic within selected range cells.

28. The method of claim 22 further comprising processing of received difference signals to derive estimates of angular locations of resolved vehicles.

29. The method of claim 22 further comprising correcting at least one of:

a. the direction of said beam of electromagnetic energy;

b. the phase of said beam of electromagnetic energy; and c. the placement of said range cells;

responsive to at least one of said position and motion of said at least one pilotless aircraft.

30. The method of claim 22 wherein said at least one pilotless aircraft comprises at least one of:

a. a free-flying aircraft; and b. an aerostat.

* * * * *